(12) United States Patent
Weiss et al.

(10) Patent No.: US 11,345,424 B2
(45) Date of Patent: May 31, 2022

(54) DEVICE FOR ATTACHING A BOTTLE TO PREVENT ACCIDENTAL RELEASE

(71) Applicants: Steven G. Weiss, Morristown, NJ (US); Janine Weiss, Morristown, NJ (US)

(72) Inventors: Steven G. Weiss, Morristown, NJ (US); Janine Weiss, Morristown, NJ (US)

( * ) Notice: Subject to any disclaimer, the term of this patent is extended or adjusted under 35 U.S.C. 154(b) by 153 days.

(21) Appl. No.: 16/919,716

(22) Filed: Jul. 2, 2020

(65) Prior Publication Data
US 2022/0001949 A1    Jan. 6, 2022

(51) Int. Cl.
*B62J 11/04*    (2020.01)
(52) U.S. Cl.
CPC ..................... *B62J 11/04* (2020.02)
(58) Field of Classification Search
CPC ............................ B62J 11/04; Y10T 403/7007
USPC ........................... 224/414; D12/411; 403/349
See application file for complete search history.

(56) References Cited

U.S. PATENT DOCUMENTS

| 3,107,028 A | * | 10/1963 | De Robertis | ...... A47G 23/0216 215/396 |
| 4,040,549 A | * | 8/1977 | Sadler | ..................... B60N 3/103 248/346.11 |
| 4,919,381 A | * | 4/1990 | Buist | .................. A47G 23/0216 248/314 |
| D352,268 S | * | 11/1994 | Kavanaugh | ................... D12/411 |
| 5,423,568 A | * | 6/1995 | Zushi | .................... B60R 21/217 403/349 |
| D360,338 S | * | 7/1995 | Westgerdes | .................... D7/510 |
| 5,573,133 A | * | 11/1996 | Park | .................... B65D 21/0228 D9/518 |
| 5,624,064 A | * | 4/1997 | McGee, Jr. | .............. B62J 11/04 215/373 |
| 5,722,574 A | * | 3/1998 | Pratt | ......................... A45F 5/00 224/660 |
| 6,834,838 B2 | * | 12/2004 | Dennis | ................... B60N 3/102 403/349 |

(Continued)

FOREIGN PATENT DOCUMENTS

GB    2356846 A    6/2001

*Primary Examiner* — Justin M Larson
(74) *Attorney, Agent, or Firm* — Porzio Bromberg & Newman P.C.

(57) ABSTRACT

A device for attaching a bottle to prevent accidental release during use. A base of the device includes a spine support connecting a lower collar and an upper collar. A plurality of pins protrude from an inner surface of the lower collar. The pins can be positioned equidistant from one another. A bottle includes a plurality of channels extending from a bottom portion of the bottle. The channels can have a greater angled lower portion extending into a lesser angled end portion. During use, the bottle is rotated, if needed, up to a quarter of a turn to receive the pins extending from the lower collar into the lower portion of respective channels of the bottle. Once pins meet channels, a slight clockwise turn pulls the bottle to a bottom of the base and secures the bottle to the base as the pins meet the ends of the respective channels. The bottle can be released from the pins with a slight counter-clockwise turn. Alternatively, the base includes a lower support which is received in a corresponding shape of a female receptacle formed in the bottle. The lower support can have a mushroom screw shape. The bottle can be twisted for locking the lower support to the bottle.

15 Claims, 8 Drawing Sheets

(56) References Cited

U.S. PATENT DOCUMENTS

| | | | | |
|---|---|---|---|---|
| 7,081,081 B2* | 7/2006 | Schutz | ............... | B04B 9/08 |
| | | | | 494/12 |
| 7,290,683 B2* | 11/2007 | Gerenraich | ......... | A47K 5/1205 |
| | | | | 248/205.5 |
| 7,311,061 B1* | 12/2007 | Wiese | ............... | G09F 17/00 |
| | | | | 403/349 |
| 7,770,748 B2* | 8/2010 | Elliott | ............ | A47G 19/2205 |
| | | | | 215/393 |
| 8,191,844 B2 | 6/2012 | Pennino | | |
| 8,764,050 B2* | 7/2014 | Baumgartner | ...... | B60R 21/2171 |
| | | | | 280/730.2 |
| 2008/0023490 A1* | 1/2008 | Gerenraich | ......... | B65D 23/003 |
| | | | | 222/180 |
| 2011/0147423 A1* | 6/2011 | Serpell | ............ | B62J 11/04 |
| | | | | 215/370 |
| 2011/0147424 A1* | 6/2011 | Brown | ............. | B62J 11/04 |
| | | | | 224/567 |
| 2021/0169205 A1* | 6/2021 | Eisenreich | ............ | B60N 3/103 |
| 2022/0001949 A1* | 1/2022 | Weiss | ............ | B62J 11/04 |

* cited by examiner

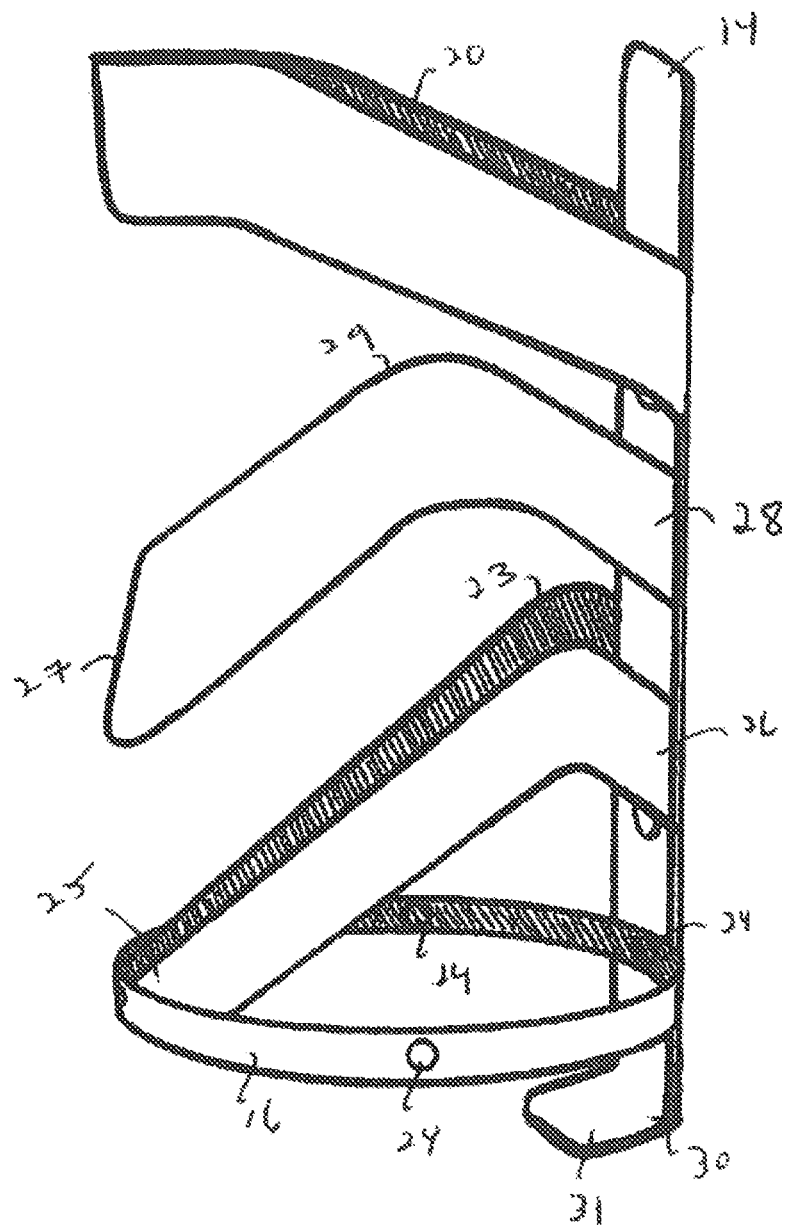

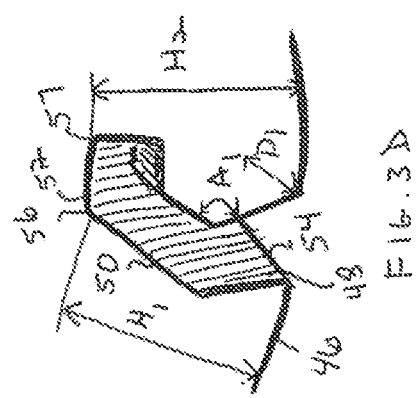

DEVICE FOR ATTACHING A BOTTLE TO PREVENT ACCIDENTAL RELEASE

BACKGROUND OF THE INVENTION

Field of the Invention

The present invention relates in general to a device for attaching a bottle to prevent accidental release and in particular to a device for easily and expeditiously securing, maintaining and removing a bottle from a base.

Description of Related Art

Container holders for use on bicycles have been described. U.S. Pat. No. 8,191,844 ("the '844 patent") describes a container holder for use on a bicycle that has a bottle having a first mating member integrally formed in a bottom portion of the bottle and a bottle holder including a mounting member for mounting the bottle holder to a portion of the bicycle. A shield forms an interior area for receiving the bottle through a first end. A second mating member is disposed towards a second end of the shield, away from the first end of the shield, and within the interior area formed by the shield. The first and second mating members having sections extending transversely to a longitudinal axis of the bottle to form opposing surfaces when the bottle is inserted into the interior area formed by the shield. When the bottle is retained by the bottle holder, the sections of the first and second mating members are aligned to vertically overlap to block movement of the bottle along the longitudinal axis of the bottle. This patent has the shortcoming of being cumbersome to manufacture and the mating members may break off during use resulting in displacement of the bottle from the container holder.

GB2356846A describes a container for liquids with co-operating support in which engagement or release of a bottle from a holder attached to a bicycle frame requires an initial twisting movement. A plastic water bottle comprises a cylindrical body having means for engagement with co-operating elements on a support. The engagement means may comprise two diametrically opposed step channels formed in a sleeve. The channels may have a number of elbow portions arranged between rectilinear portions which may be aligned parallel and perpendicular to the cylindrical surface. One end of the channels may be open, the other end may have a recess for locating the co-operating element. The co-operating elements may comprise two diametrically opposed pins mounted on cage support. The co-operating elements may engage with the slots so as to allow a twisting movement to lock the bottle in the support. A small deformation of the water bottle or cage allows pins to slip over ridge.

It is desirable to provide an improved device for expeditiously attaching a bottle to a support and retaining the bottle during use to prevent accidental release without needing deformation of a water bottle or cage. The improved device having low manufacturing costs.

SUMMARY OF THE INVENTION

The present invention relates to a device for attaching a bottle to prevent accidental release during use. In one embodiment, the device is used for attaching a bottle to a part of a bicycle. Alternatively, the device can be used to attach the bottle to a backpack support or any other type of support. The device allows the bottle to be expeditiously attached and removed.

A base of the device includes a spine support connecting a lower collar and an upper collar. A plurality of pins protrude from an inner surface of the lower collar. The pins can be positioned equidistant from one another. In one embodiment, four equidistant pins extend inwardly from the lower collar. A middle rib having an open ring shape can be connected to the spine support between the upper and lower collar. A lower rib can extend from the lower collar as a truss to the spine support.

A bottle includes a plurality of channels extending from a bottom portion of the bottle. The channels can have a greater angled lower portion extending into a lesser angled end portion. In one embodiment, the lower portion of the channel is at a 45 degree angle to the bottom surface of the bottle and the end portion of the channel is substantially horizontal.

During use, the bottle is received in the base and inserted towards the bottom of the base. The bottle is rotated, if needed, up to a quarter of a turn to receive the pins extending from the lower collar into the lower portion of respective channels of the bottle. The pins slide from the lower portion of the respective channel to the end portion of the channel. The pins are retained within the end portion of the respective channel until further rotation of the bottle. The bottle can be removed from the base by rotating the bottle in the opposite direction and sliding the pins out of the channels.

The present invention has the advantage that only a quarter of a turn is needed to engage the bottle into the base without deforming the bottle. The arrangement of the pins equidistant from one another at four positions of the lower collar provides support of the bottle and prevents the bottle from being accidently discharged from the base during use. The middle rib can provide a pinching force to prevent the bottle from moving out of the locked position unintentionally or rattling around. The truss support provides strength and durability of the base. Depending on the material used for the base, the base can maintain durability with a truss support of a reduced size or without a truss support.

In an alternate embodiment, the base includes a lower support which is received in a corresponding shape of a female receptacle formed in the bottle. The lower support can have a mushroom screw shape. The bottle can be twisted for locking the lower support to the bottle.

The device provides structure for attaching a bottle and retaining the bottle during use which can be produced with low manufacturing costs.

The invention will be more fully described by reference to the following drawings.

BRIEF DESCRIPTION OF THE DRAWINGS

FIG. 2 is a side schematic view of the device for attaching a bottle.

FIG. 3D is a schematic front view of a channel which can be formed in the bottle shown in FIG. 3A.

DETAILED DESCRIPTION

Figure 1:
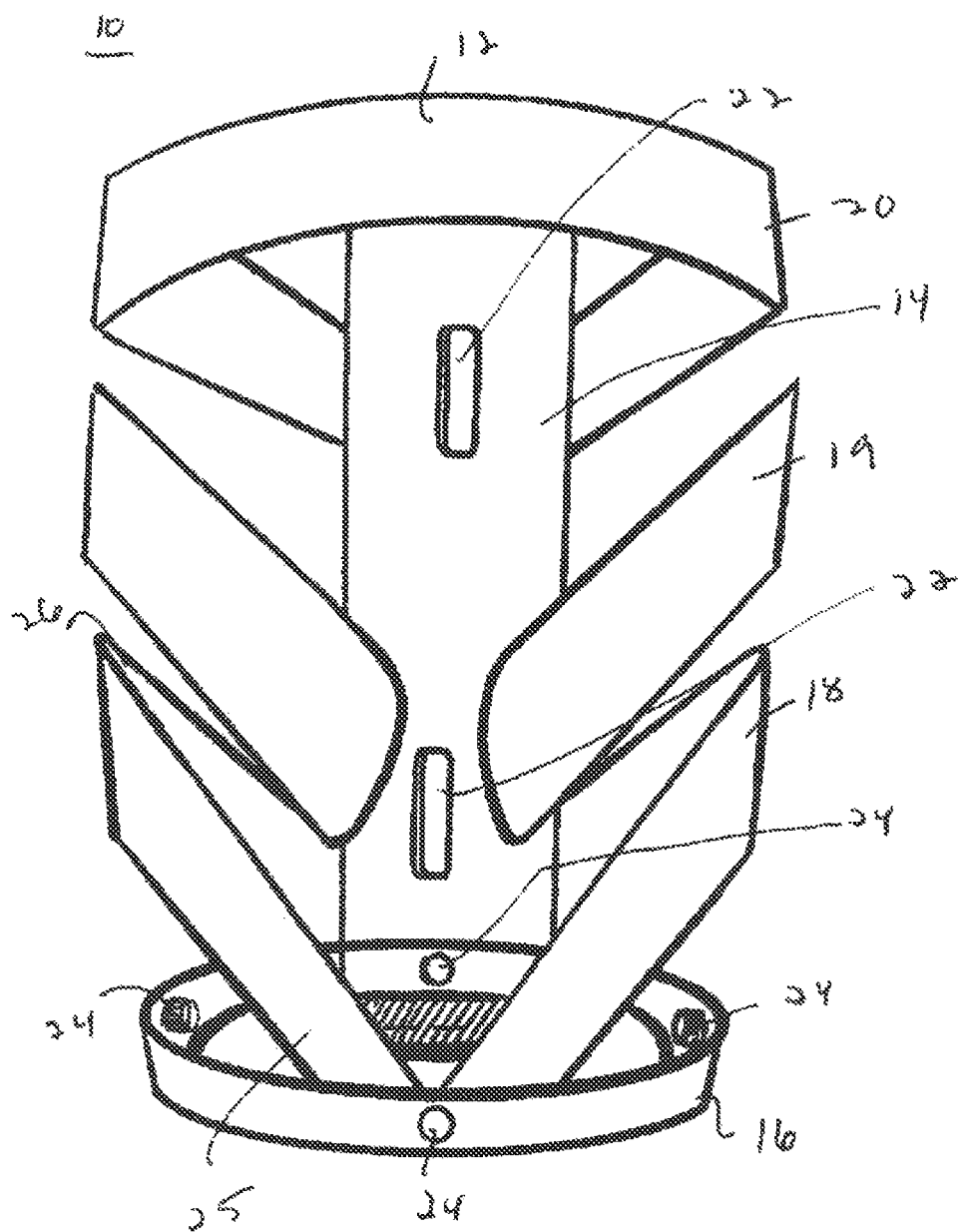
FIG. 1 is a front schematic view of a device for attaching a bottle.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates device for attaching a bottle to prevent accidental release 10 in accordance with the teachings of the present invention. Base 12 includes spine support 14, lower collar 16, lower rib 18, middle rib 19 and upper collar 20. Spine support 14 can be coupled or integral with lower collar 16, lower rib 18, middle rib 19 and upper collar 20. Coupling openings 22 extend through support 14. Coupling openings 22 can be used to couple base 12 to an object or support. Example objects include a bicycle or a support of a backpack.

Base 12 can be made of a rigid or semi-rigid material. For example, base 12 can be made of carbon fiber, metal, aluminum, steel, an alloy or plastic. A suitable plastic is rigid polyvinyl chloride (PVC). Preferably, base 12 is formed of carbon fiber.

A plurality of pins 24 protrude inwardly from lower collar 16. Pins 24 can be positioned equidistant from one another. In one embodiment, four pins 24 are positioned equidistant from one another around the inner circumference of lower collar 16. For example, pins 24 can be about 3/16 inches long and about 5/32 inches in diameter.

Lower rib 18 can include side supports 25 having a first end coupled or integral with lower collar 16. A second end 23 of side supports 25 is coupled or integral with lower base support 26 as shown in FIG. 2. Lower base support 26 can be coupled or integral with spine support 14. Side supports 25 can be angled from lower collar 16 to form a truss to spine support 14.

Referring to FIG. 1, middle rib 19 can be connected to spine support 14 between lower collar 16 and upper collar 20. Middle rib 19 can have an open ring shape. Middle rib 19 can include side supports 27. End 29 of side supports 27 is coupled or integral with middle base support 28 as shown in FIG. 2. Middle base support 28 can be coupled or integral with spine support 14. Side supports 27 can be angled downwardly from middle base support 28. Side supports 27 can be angled downwardly at various angles or can have various shapes to provide pinching of a received bottle.

Bottle stopper 30 can be positioned at one end of spine support 14. Bottle stopper 30 can be used to prevent a received bottle from extending through base 12. Bottle stopper 30 can include extension 31 for receiving a bottom of a received bottle. For example, extension 31 of bottle stopper 30 can have a length of about 5/8 inch. A distance from top of pin 24 to extension 31 can be about 7/16 inches. It will be appreciated that various dimensions of bottle stopper 30 can be used with the teachings of the present invention.

Figure 3A:
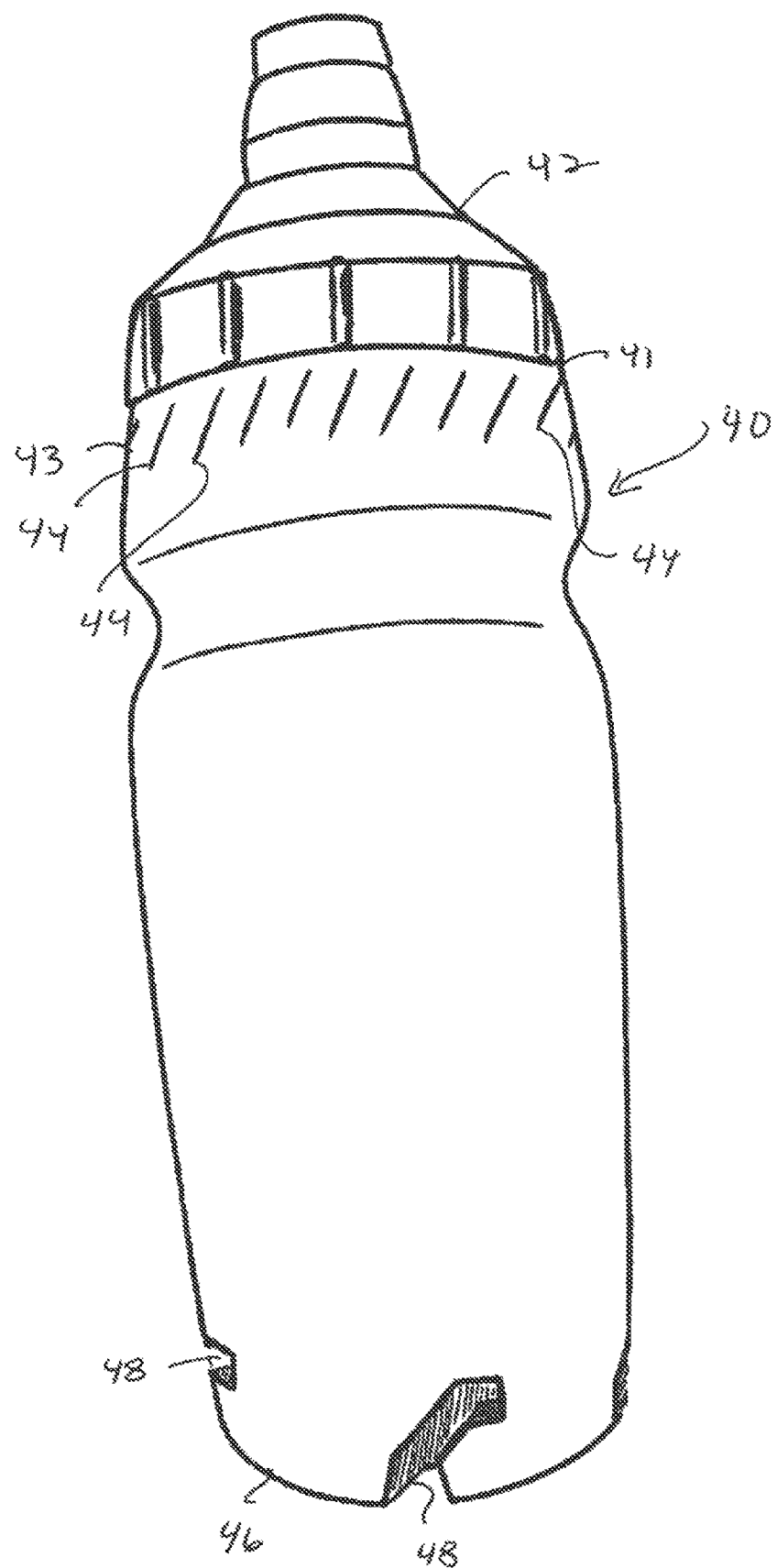
FIG. 3A is a schematic front view of a bottle which can be used with the device for attaching a bottle shown in FIG. 1.

Bottle 40 includes top portion 41 as shown in FIG. 3A. Bottle cap 42 can be coupled or extend from top portion 41 for opening and closing bottle 40. Gripping portion 43 can be positioned on a side surface of bottle 40. Gripping portion 43 can be used to help grip bottle 40. For example, gripping portion 43 can be gripped for twisting bottle 40 during alignment of bottle 40 with base 12 or during use of bottle 40 after removal of bottle 40 from base 12. Gripping portion 43 can include a plurality of ribs 44. For example, ribs 44 can be vertical or angled. Bottle 40 can be used to hold any liquid. For example, bottle 40 can be used for water. Bottle cap 42 can have various shapes for dispensing liquid from bottle 40.

Lower portion 46 of bottle 40 includes a plurality of channels 48. Channels 48 can be positioned equidistant from one another. In one embodiment, four channels 48 are positioned equidistant from one another extending around the circumference of lower portion 46 of bottle 40 as shown in FIG. 3B. Channels 48 can extend at an angle to lower portion 46 of bottle 40.

Figure 3C:
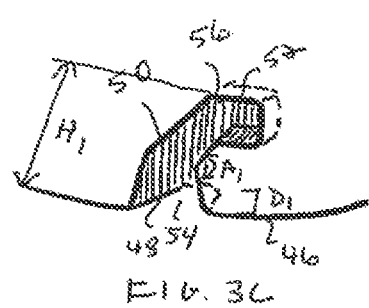
FIG. 3C is a schematic front view of a channel which can be formed in the bottle shown in FIG. 3A.
Figure 3B:
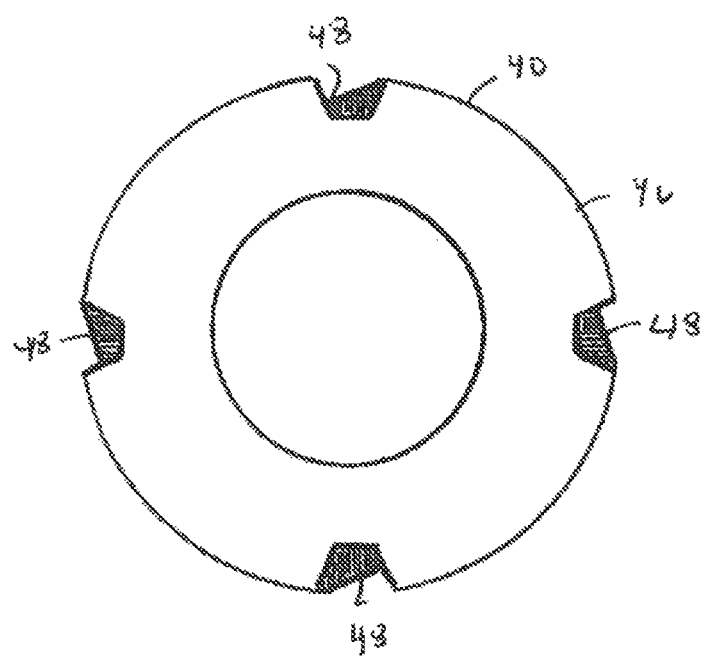
FIG. 3B is schematic bottom view of the bottle shown in FIG. 3B.

Channels 48 can have a greater angled lower channel portion 50 extending into a lesser angled end channel portion 52 to form tapered channel as shown in FIG. 3C and FIG. 3D. In one embodiment, lower channel portion 50 is positioned at an angle to channel opening 54 of channel 48. Angle A1 of lower channel portion 50 can be in the range of about 30 degrees to about 60 degrees, about 35 degrees to about 55 degrees, or about 40 degrees to about 50 degrees. In one embodiment, lower channel portion 50 is at a 45 degree angle to channel opening 54 of channel 48 and lower portion 46 of bottle 40 as shown in FIG. 3C. End channel portion 52 is positioned substantially horizontal to lower channel portion 50. Alternatively, end channel portion 52 is positioned at a slight downward angle to lower channel portion 50 to dip down end channel portion as shown in FIG. 3D. The slight downward angle can be in the range of about 1 degrees to about 5 degrees.

Channel 48 can have a larger circumference in lower channel portion 50 than end channel portion 52 to allow channel 48 to narrow between lower channel portion 50 and end channel portion 52. Referring to FIG. 3C, for example, channel opening 54 of lower channel portion can have about ¼ inch width which tapers to a width of 5/32 inches at end channel portion 52. End channel portion 52 can have a width which is substantially the same or slightly larger than received pin 24. Height H1 to top 56 of channel can be about ½ inch. Depth D1 of channel 48 can be about 7/32 inch deep. Bottle stopper 30, as shown in FIG. 2, can have a shorter height to top of pin 24 than height H1 of channel 48 to cause a tight fit when bottle 40 is inserted within base 12 and is received adjacent bottle stopper 30. In one embodiment, height H1 of channel 48 can be about ½ inches and a distance from top of pin 24 to extension 31 of bottle stopper 30 can be about 7/16 inches.

Referring to FIG. 3D, for example, channel opening 54 of lower channel portion can have about ¼ inch width which tapers to a width of 5/32 inches at end channel portion 52. End channel portion 52 can have a width which is substantially the same or slightly larger than received pin 24. Height H1 to top 56 of lower channel portion can be slightly larger than height H2 to top 57 of end channel portion 52. Height H1 to top 56 of channel can be about ½ inch. Height H2 to top 57 of end channel portion 52 can be about 7/16 inch. Depth D1 of channel 48 can be about 7/32 inch deep. It will be appreciated that in accordance with the teachings of the present invention various dimensions and angles for channel 48 can be used.

During use, bottle 40, shown in FIG. 3A, is received in base 12, shown in FIGS. 1 and 2, and inserted towards lower collar 16. Bottle 40 is rotated, if needed, up to a quarter of a turn to receive pins 24 extending from lower collar 16 into lower channel 50 of respective channels 48. Pins 24 slide from lower channel portion 50 of respective channel 48 to end channel portion 52. Pins 24 are retained within end channel portion 52 until further rotation of bottle 40 to prevent bottle 40 from accidently being removed from base 12. Side supports 27 of middle rib 19 extend along a portion of bottle 40 for pinching and retaining bottle 40 within base 12. Bottle 40 can be removed from base 12 by rotating bottle 40 in an opposite direction and sliding pins 24 out of channels 48. In one embodiment, four pins 24 are received in corresponding four channels 48 of bottle 40. Bottle 40 is rotated up to a quarter of a turn to receive pins 24 extending into the lower channel portion 50 of respective channels 48 of bottle 40.

Figure 4:
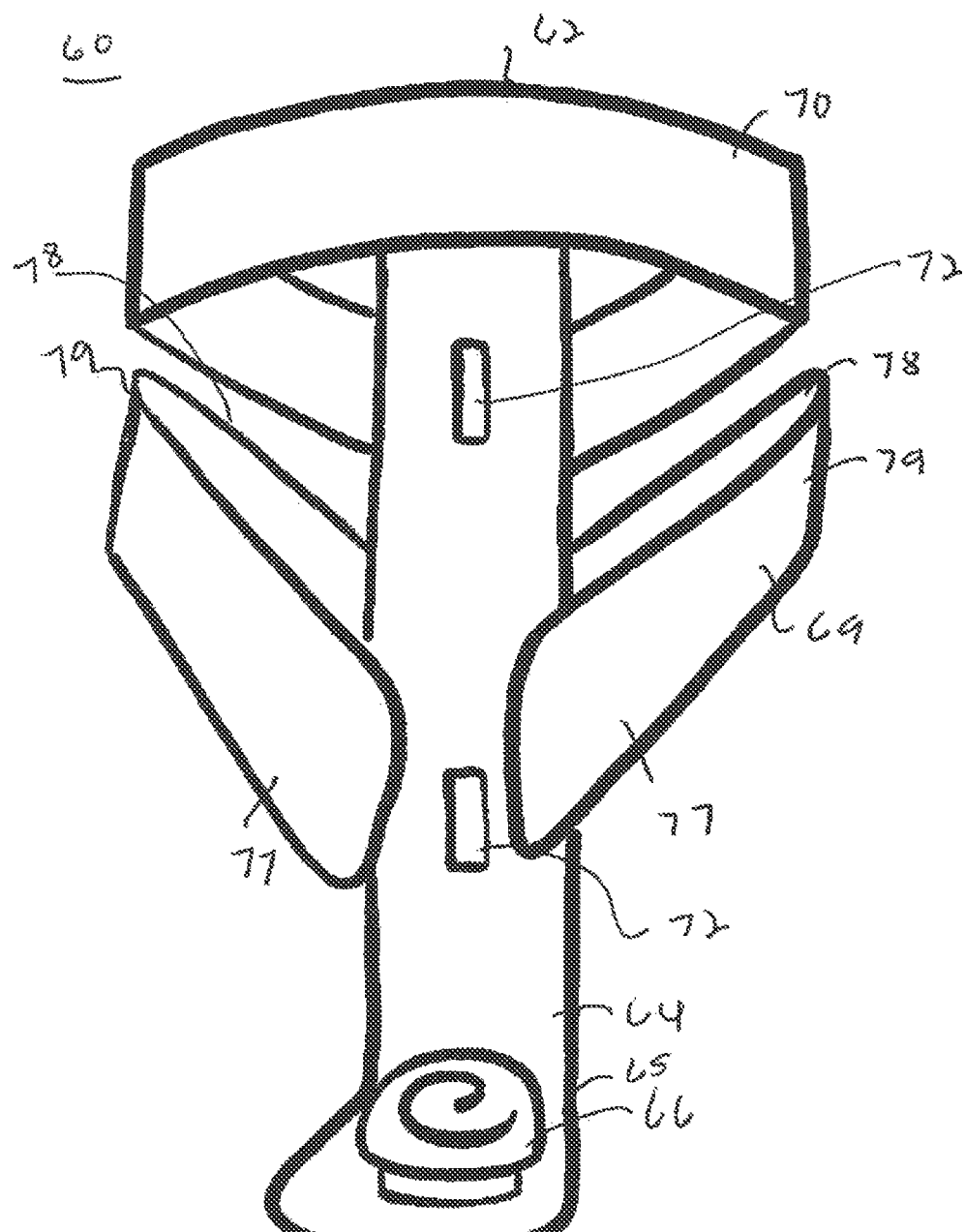
FIG. 4 is a front schematic view of a device for attaching a bottle.

FIG. 4 illustrates device for attaching a bottle 60 in accordance with the teachings of the present invention. Base 62 includes spine support 64, lower support 66, middle rib 69 and collar 70. Middle rib 69 is positioned between lower support 66 and collar 70. Spine support 64 can include lower spine portion 65 which can be coupled or integral with lower support 66. Lower support 66 can be formed as a protrusion or knob. In one embodiment lower support has a mushroom screw shape. Middle rib 69 and collar 70 can be coupled or integral with spine support 64. Coupling openings 72 extend through spine support 64. Coupling openings 72 can be used to couple base 62 to an object or support.

Base 62 can be made of a rigid or semi-rigid material. For example, base 62 can be made of carbon fiber, metal, aluminum, steel, an alloy or plastic. A suitable plastic is rigid polyvinyl chloride (PVC). Preferably, base 62 is formed of carbon fiber.

Middle rib 69 can be connected to spine support 64 between lower support 66 and upper collar 70. Middle rib 69 can have an open ring shape. Middle rib 69 can include side supports 77. End 79 of side supports 77 is coupled or integral with middle base support 78. Middle base support 78 can be coupled or integral with spine support 64. Side supports 77 can be angled downwardly from middle base support 78.

Figure 5:
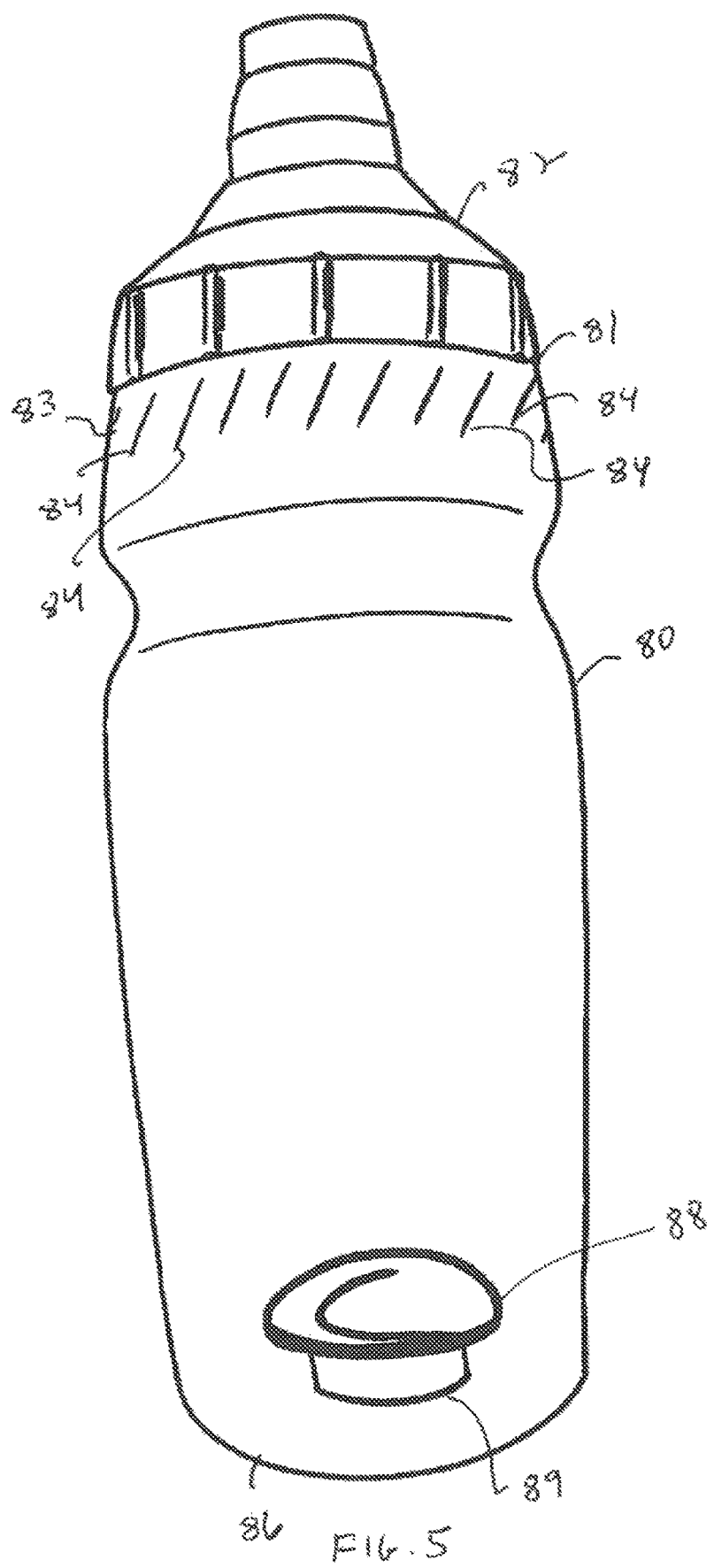
FIG. 5 is a schematic view of a bottle which can be used with the device for attaching a bottle shown in FIG. 4.

Bottle 80 includes top portion 81 as shown in FIG. 5. Bottle cap 82 can be coupled or extend from top portion 81 for opening and closing bottle 80. Gripping portion 83 can be positioned on a side surface of bottle 80. Gripping portion 83 can be used to help grip bottle 80. For example, gripping portion 83 can be gripped during alignment of bottle 80 with base 62 or during use of bottle 80 after removal of bottle 80 from base 62. Gripping portion 83 can include a plurality of ribs 84. For example, ribs 84 can be vertical or angled. Bottle 80 can be used to hold any liquid. For example, bottle 80 can be used for water. Bottle cap 82 can have various shapes for dispensing liquid from bottle 80.

Lower portion 86 of bottle 80 includes bottle coupling member 88. Bottle coupling member 88 can have a recessed female receptacle portion as an aperture having a knob shape slightly bigger than a shape of lower support 66. Bottle coupling member 88 includes opening 89 for receiving lower support 66. Lower support 66 can include ridges which screw into corresponding ridges of the coupling member to lock lower support 66 within opening 89 of coupling member 88 by a twisting movement. Side supports 77 of middle rib 69 extend along a portion of bottle 80 for pinching and retaining bottle 80 within base 62. After lower support 66 is received in opening 89 lower support 66 can expand within coupling member 88 to prevent bottle 80 from accidently being removed from base 62. Bottle 80 can be removed from base 62 by rotating bottle 80 in an opposite direction and removing lower support 66 from the recessed female receptacle portion.

Figure 6:
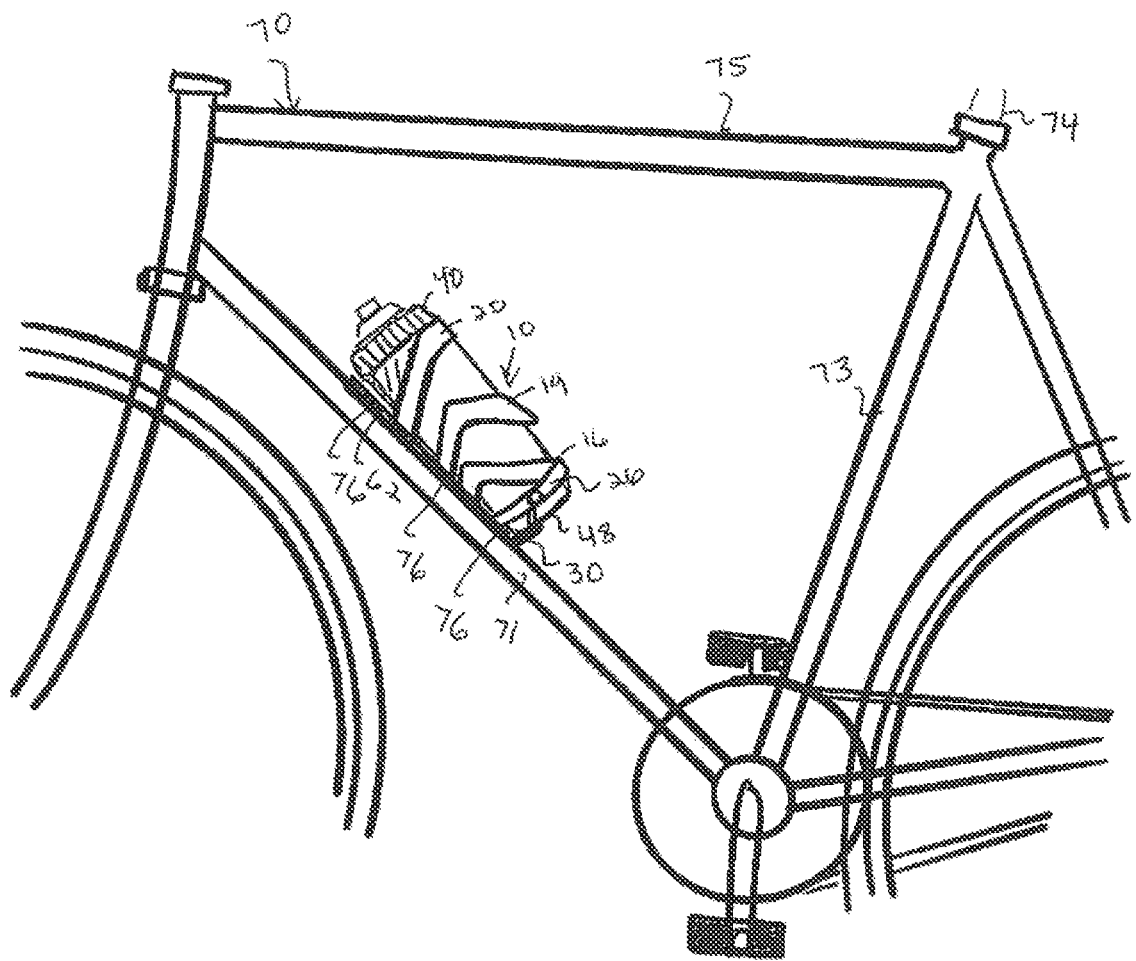
FIG. 6 is a schematic view of the device for attaching a bottle attached to a frame of a bicycle.

Base 62 can be coupled to bicycle 70 as shown in FIG. 6. Base 12 can be coupled to base 62. Coupling members 76 of base 62 can be coupled to coupling openings 22 of base 12. Base 62 can be a bracket attached to front portion 71, middle portion 73 or rear portion 74 of frame 75. Rear portion of frame 74 can be positioned behind a saddle of bicycle 70. A plurality of bases 62 can be attached to various portions of frame 75 to attach a plurality of bases 12 for carrying a plurality of bottles 40. Base 12 and base 62 can be made of a rigid or semi-rigid material. For example, base 12 and base 62 can be made of metal or plastic. A suitable metal is steel, aluminum or an alloy. A suitable plastic is rigid polyvinyl chloride (PVC). It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed:

1. A device for attaching a bottle to prevent accidental release comprising:
    a base;
    the base having a spine support, lower collar and upper collar, the lower collar and upper collar being coupled or integral with the spine support; and
    a plurality of pins being positioned equidistant from one another to extend inwardly around an inner circumference of the lower collar;
    the plurality of pins being received in a respective channel of a bottle, the channel being positioned at a lower portion of the bottle, the channel having a lower channel portion extending into an end channel portion, the lower channel portion being angled from a bottom of the bottle at a greater angle than the end channel portion,
    wherein the pins slide into the lower channel portion and are received in the end channel portion upon rotation of the bottle, the pins being retained in the end channel portion until the bottle is rotated in an opposite direction.

2. The device of claim 1 wherein the lower channel portion is positioned at an angle to the lower portion of the bottle in the range of about 30 degrees to about 60 degrees, about 35 degrees to about 55 degrees or about 40 degrees to about 50 degrees.

3. The device of claim 1 wherein the lower channel portion is positioned at an angle of 45 degrees to the lower portion of the bottle.

4. The device of claim 1 wherein the end channel portion is positioned substantially laterally from the lower channel portion.

5. The device of claim 1 wherein the end channel portion is positioned at a downward angle to the lower channel portion.

6. The device of claim 1 wherein the end channel portion is positioned at a downward angle to the lower channel portion in the range of about 1 degrees to about 5 degrees.

7. The device of claim 1 wherein the lower channel portion has a larger circumference than the end channel portion.

8. The device of claim 1 further comprising:
    a middle rib coupled or integral to the spine support, the middle rib being positioned between the lower collar and the upper collar and the middle rib having an open ring shape.

9. The device of claim 1 wherein the middle rib is formed of a pair of side supports each side support coupled or integral with a middle base support, the middle base support coupled or integral with the spine support, and the side supports being angled downwardly from the middle base support.

10. The device of claim 1 further comprising four of the pins, each of the pins received in a respective one of four of the channels of the bottle, the bottle is rotated up to a quarter of a turn to receive the pins into the lower channel portion of a respective one of the channels.

11. The device of claim 1 further comprising a lower rib coupled or integral with the lower collar, the lower rib comprising side supports coupled or integral with a lower base support, the lower base support coupled or integral with the spine support, the side supports being angled from the lower collar to form a truss to the spine support.

12. The device of claim 1 wherein the bottle includes one or more gripping portions in a side of the bottle.

13. The device of claim 12 wherein the gripping portions include one or more ribs.

14. The device of claim 1 further comprising one or more coupling members which extend through the spine support, wherein the one or more coupling members couple to an object or support.

15. The device of claim 14 wherein the one or more coupling members are mounted to a bicycle.

* * * * *